(12) United States Patent
Epshteyn (10) Patent No.: US 7,321,935 B2
(45) Date of Patent: Jan. 22, 2008

(54) METHOD AND APPARATUS FOR INCREASING TCP/IP SERVER RESPONSIVENESS

(75) Inventor: Yevgeniy Epshteyn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 10/177,024

(22) Filed: Jun. 21, 2002

(65) Prior Publication Data

US 2003/0236841 A1 Dec. 25, 2003

(51) Int. Cl.
*G06F 15/16* (2006.01)
(52) U.S. Cl. ............... 709/230; 709/250; 709/206; 707/10; 707/200; 707/201; 707/8
(58) Field of Classification Search ............... 709/230, 709/250, 206; 707/10, 200, 201, 8
See application file for complete search history.

(56) References Cited

U.S. PATENT DOCUMENTS

| | | | | |
|---|---|---|---|---|
| 6,415,292 | B1 * | 7/2002 | Kamvysselis | 707/10 |
| 6,421,787 | B1 * | 7/2002 | Slaughter et al. | 714/4 |
| 6,434,620 | B1 * | 8/2002 | Boucher et al. | 709/230 |

\* cited by examiner

*Primary Examiner*—David Wiley
*Assistant Examiner*—Kyoung H Shin
(74) *Attorney, Agent, or Firm*—Marger, Johnson, & McCollom, P.C.

(57) ABSTRACT

An embodiment of the invention is a method and apparatus for a client and server to communicate across a network. The client initiates a communication using a reliable protocol, and transmits in parallel a data request. The data request may be sent using an unreliable protocol. The server begins processing the data request before the connection using the reliable protocol is established. Once the reliable connection is complete, the client retransmits the data request, to which the server responds using the reliable protocol.

36 Claims, 11 Drawing Sheets

METHOD AND APPARATUS FOR INCREASING TCP/IP SERVER RESPONSIVENESS

FIELD

This invention pertains to network communications, and more particularly to increasing the response time to TCP/IP requests.

BACKGROUND

Figure 1:
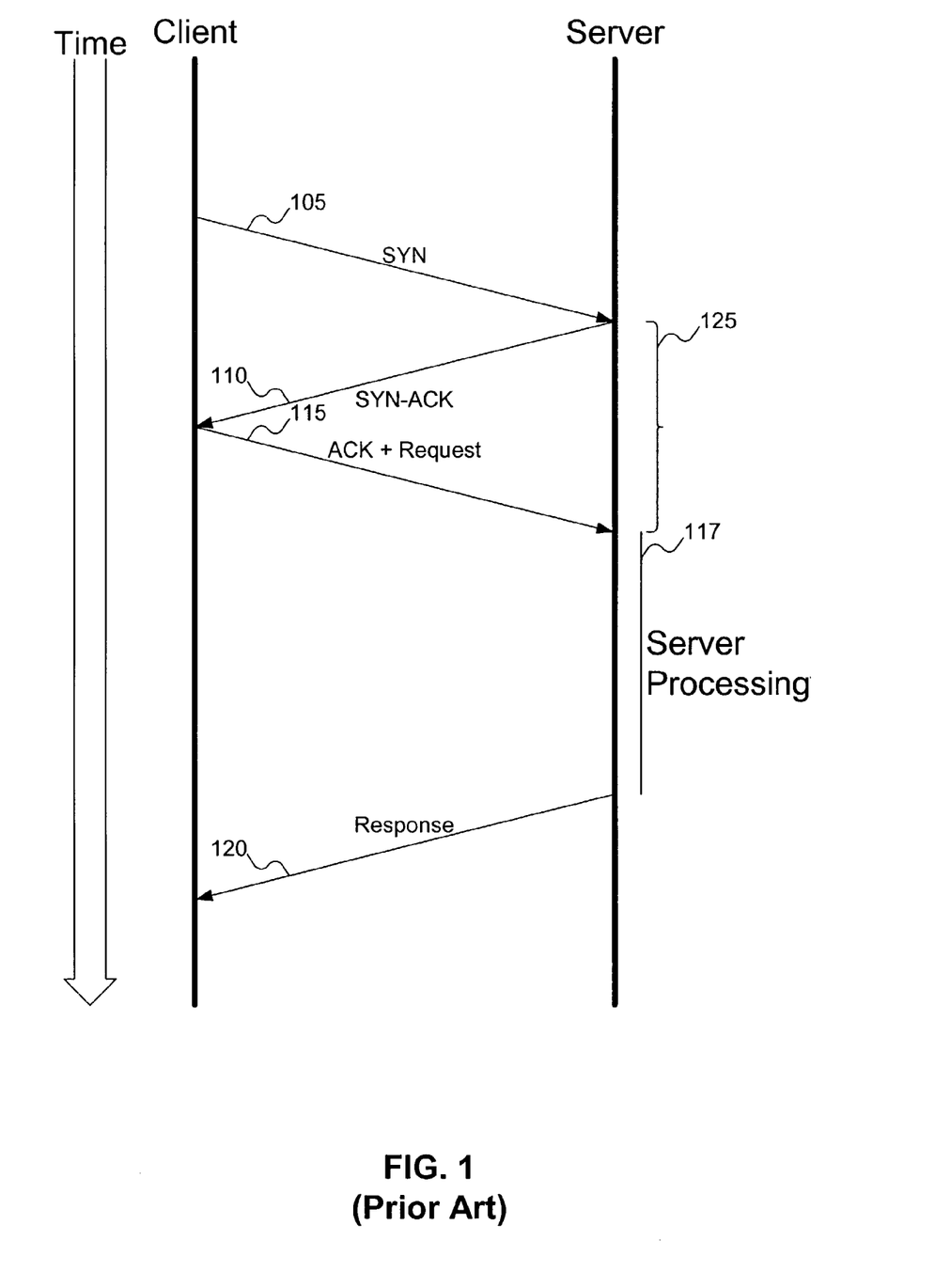
FIG. 1 shows the communications between a client and a server according to the prior art.

Communications across networks today typically rely on reliable protocols, such as the Transmission Control Protocol/Internet Protocol (TCP/IP). As illustrated in FIG. 1, to establish a connection between a client and server using a reliable protocol, the client sends synchronization packet 105 to the server. The contents of synchronization packet 105 contain little more than a source address (the client's Internet Protocol (IP) address) and port, a destination address and port (the server's IP address), a sequence number, and a flag identifying the packet as a synchronization packet. The server responds with synch/acknowledgment packet 110, which has both the synchronization and acknowledgment flags set, includes its own sequence number, and uses the successor to the client's sequence number as its acknowledgment number. The client follows that up with acknowledgment packet 115, which has the acknowledgment flag set, uses the client's next sequence number, and uses the successor to the server's sequence number as the client's acknowledgment number. In the body of acknowledgment packet 115, the client includes the data request for the first time. At this point, the server may process the request, which takes some time (shown as processing interval 117). Finally, the server responds with response 120.

This three message connection mechanism, including synchronization packet 105, synch/acknowledgment packet 110, and acknowledgment packet 115, is known colloquially as a handshake. The handshake lets both parties (that is, the client and server) know that the other is aware of the connection by the use of their respective sequence numbers. The client knows that the server recognizes the connection, because the server has acknowledged the synchronization request and included the successor to the client's sequence number in the packet. And the server knows that the client recognizes the connection, because the client used the successor to the server's sequence number. This makes the connection reliable. Other reliable protocols, while differing in specifics, still rely on some sort of interchange between the client and server before data begins to flow between the two.

Because data does not start to flow in connections established by reliable protocols until after the handshake, some time is lost between when the source party knows it needs the data and when the source party may begin to receive the data. For example, notice interval 125. This is the interval from when the server first received synchronization packet 105 and when the server began processing the request (after receiving acknowledgment packet 115 with the data request). Because the connection is not established until the handshake is complete, the time during which the handshake is performed is wasted.

In contrast to reliable protocols, there are various unreliable protocols. Although they differ in specifics, they share the property that data begins to flow in the first packet sent by either party. But because the source party may not be sure that the requests will be received or recognized by the destination party, the source party might not receive an answer.

DETAILED DESCRIPTION

Figure 2:
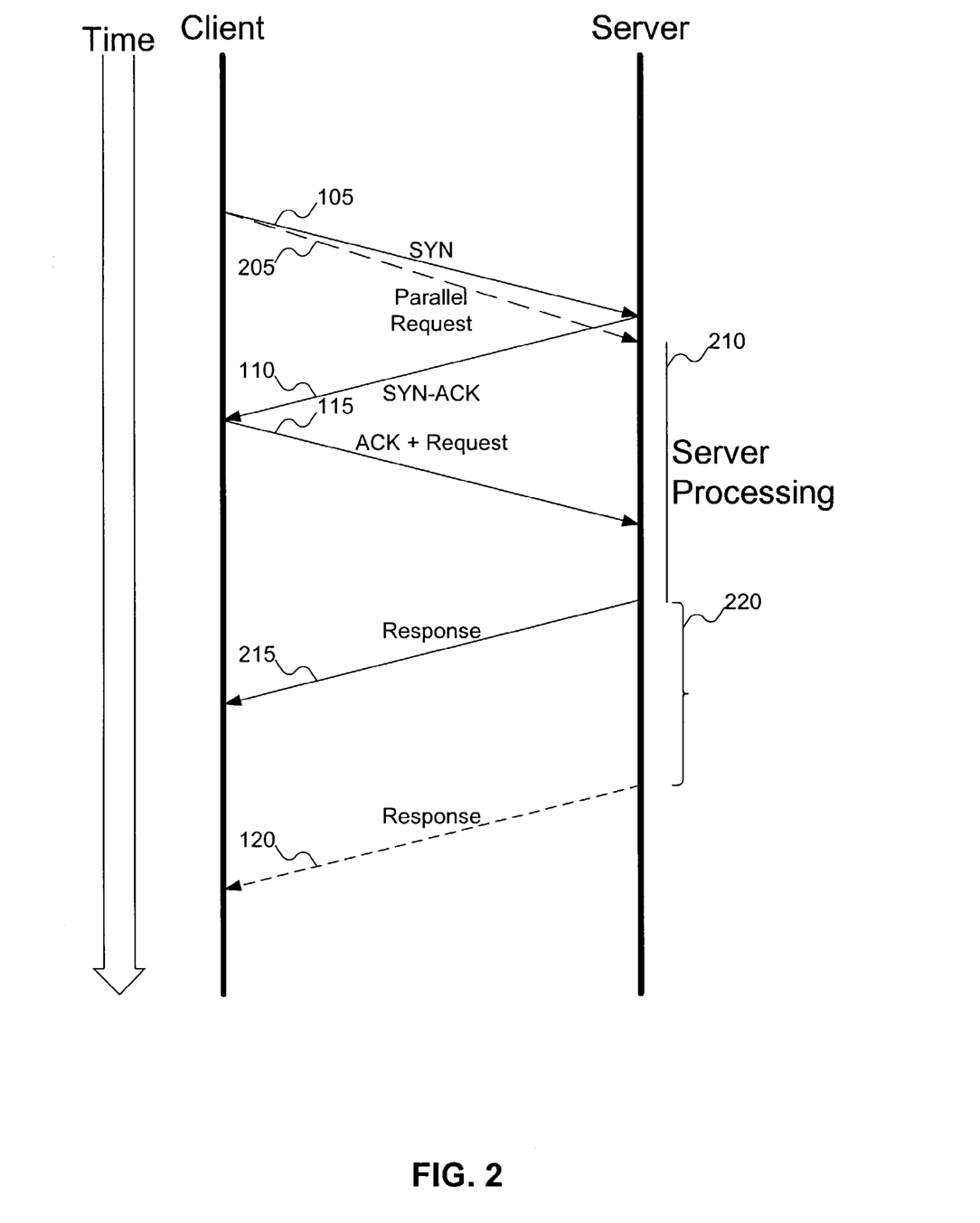
FIG. 2 shows the communications between a client and a server according to an embodiment of the invention.

FIG. 2 shows the communications between a client and a server according to an embodiment of the invention. In FIG. 2, the client sends to the server the standard synchronization packet 105, receives the standard synch/acknowledgment packet 110, and responds with the standard acknowledgment/data request 115. But in parallel with synchronization packet 105, the client also sends first data request 205 to server. This parallel request is sent via an unreliable protocol. In one embodiment, the unreliable protocol is a user datagram protocol (UDP). In a second embodiment, the unreliable protocol uses a raw IP packet. A person skilled in the art will recognize other unreliable protocols that may be used.

By using an unreliable protocol, little or no time is wasted establishing the connection before the data request is sent. This allows the server to immediately start processing the data request. Note that processing interval 210 begins when parallel request 205 is received. Then, once the handshake is completed and the client resends the data request (as part of acknowledgment packet 115), the server has (hopefully) already begun to process the data request. This means that the server may send response 215 earlier than it otherwise would have, saving time interval 220.

There are several points worth noting about this mechanism for improving server response time. First, no change is needed to the existing Transmission Control Protocol/Internet Protocol (TCP/IP) standard. The handshake process is unchanged. Parallel request 205 is sent using an unreliable protocol, which means that it does not affect the TCP/IP protocol handshake (or any other reliable protocol handshake).

Second, since the parallel request is made using an unreliable protocol, there is a risk that the packet might be lost (the risk associated with an unreliable protocol). But in that case, the only consequence is the loss of an earlier response from the server. Note that acknowledgment packet 115 still includes the data request. If it should happen that the server does not receive parallel request 205 using the unreliable protocol or ignores parallel request 205, the request is still sent after the handshake is complete. Therefore, the server will still receive the request and be able to respond to it.

Third, if the server does not know what to do with parallel request 205, it will discard it. As just discussed, this does not affect the transmission of the data request after the handshake is complete. Thus, even if the server discards parallel request 205 because it does not know what to do with it, all that is lost is the earlier response the server might have provided had it known what to do with parallel request 205.

Fourth, the server needs to be able to match up parallel request 205 with acknowledgment 115. By sending parallel request 205 using an unreliable protocol, the server does not know that parallel request 205 is designed to speed up a response to acknowledgment 115. When the client sends acknowledgment 115 to the server, the client includes the same data as sent in parallel request 205. Once the server has received acknowledgment 115, the server sees that the data request in acknowledgment 115 and parallel request 205 are the same, and the server may respond to the data request within acknowledgment 115 with the response prepared for parallel request 205.

Figure 3:
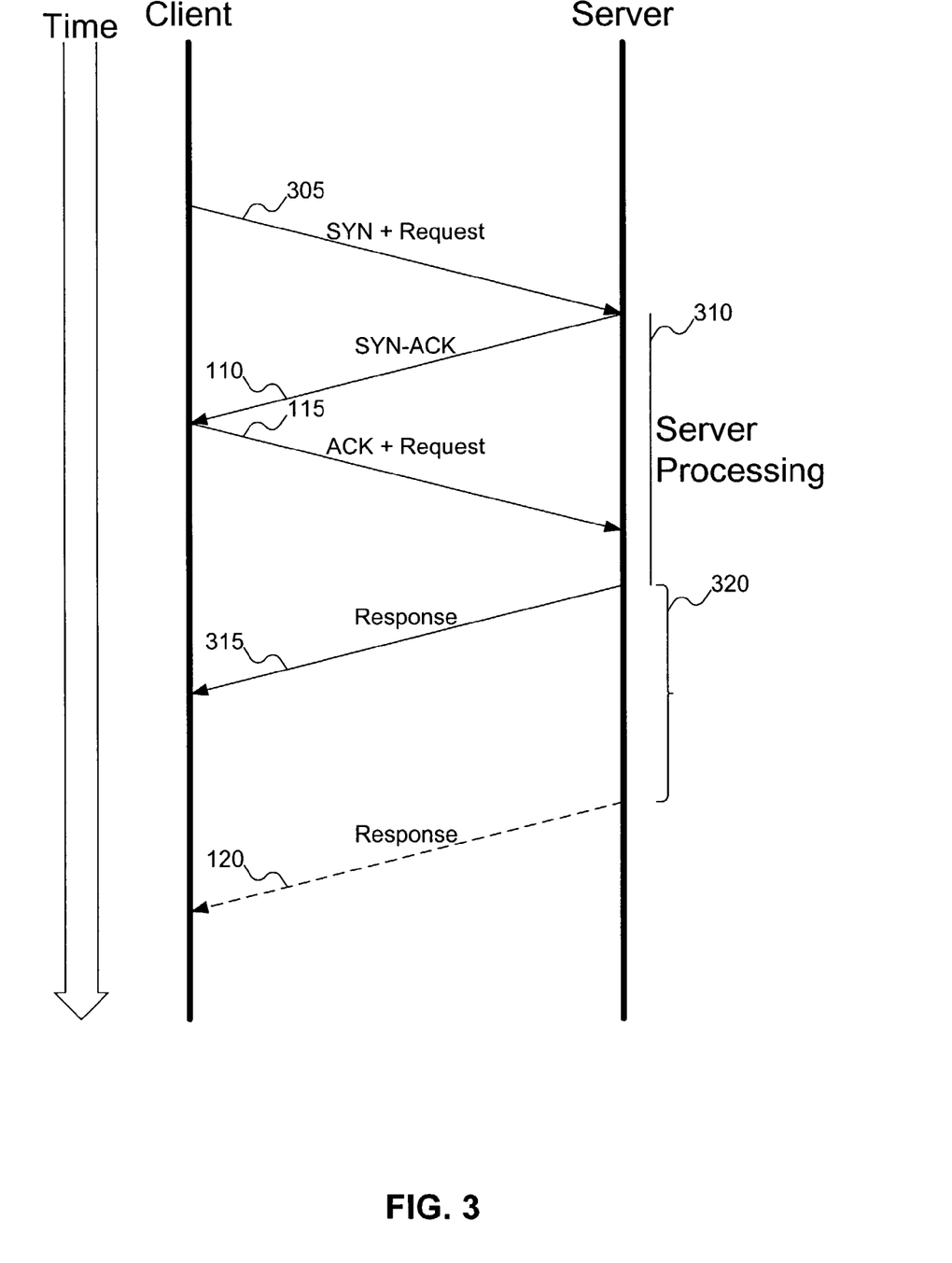
FIG. 3 shows the communications between a client and a server according to a second embodiment of the invention.

FIG. 3 shows the communications between a client and a server according to a second embodiment of the invention. Recall that the synchronization packet sent to initiate the TCP/IP handshake has the synchronization flag set, and little else. There is no reason that data could not be included in the synchronization packet. FIG. 3 reflects this embodiment.

In FIG. 3, the client sends synchronization packet 305, which includes the data request. No parallel request is needed, since the data request is included in synchronization packet 305. The server responds with synch/acknowledgment packet 110, as before, and may immediately begin processing the data request, as shown by processing interval 310. The client receives synch/acknowledgment packet 110, and responds with acknowledgment packet 115, which again includes the data request. Finally, the server sends response 315. Again, time interval 320 is saved by having the server begin processing the data request earlier.

In contrast with the procedure explained above with reference to FIG. 2, sending the data request as part of the synchronization packet requires a slight modification of the TCP/IP protocol. Because data normally is not transmitted before the handshake is complete, computers receiving synchronization packets routinely examine only the synchronization flag and ignore any other data in the packet. Thus, unless computers are modified to examine the packet for other data, including the data request in synchronization packet 305 will accomplish nothing. But if a server that is not designed to expect modified synchronization packet 305 receives such a packet, the result will be that the first data request will be ignored. When the client sends acknowledgment packet 115, acknowledgment packet 115 again will include the second data request. Thus, the only loss from the server ignoring the data in synchronization packet 305 is the time savings to respond to acknowledgment packet 115.

Figure 4:
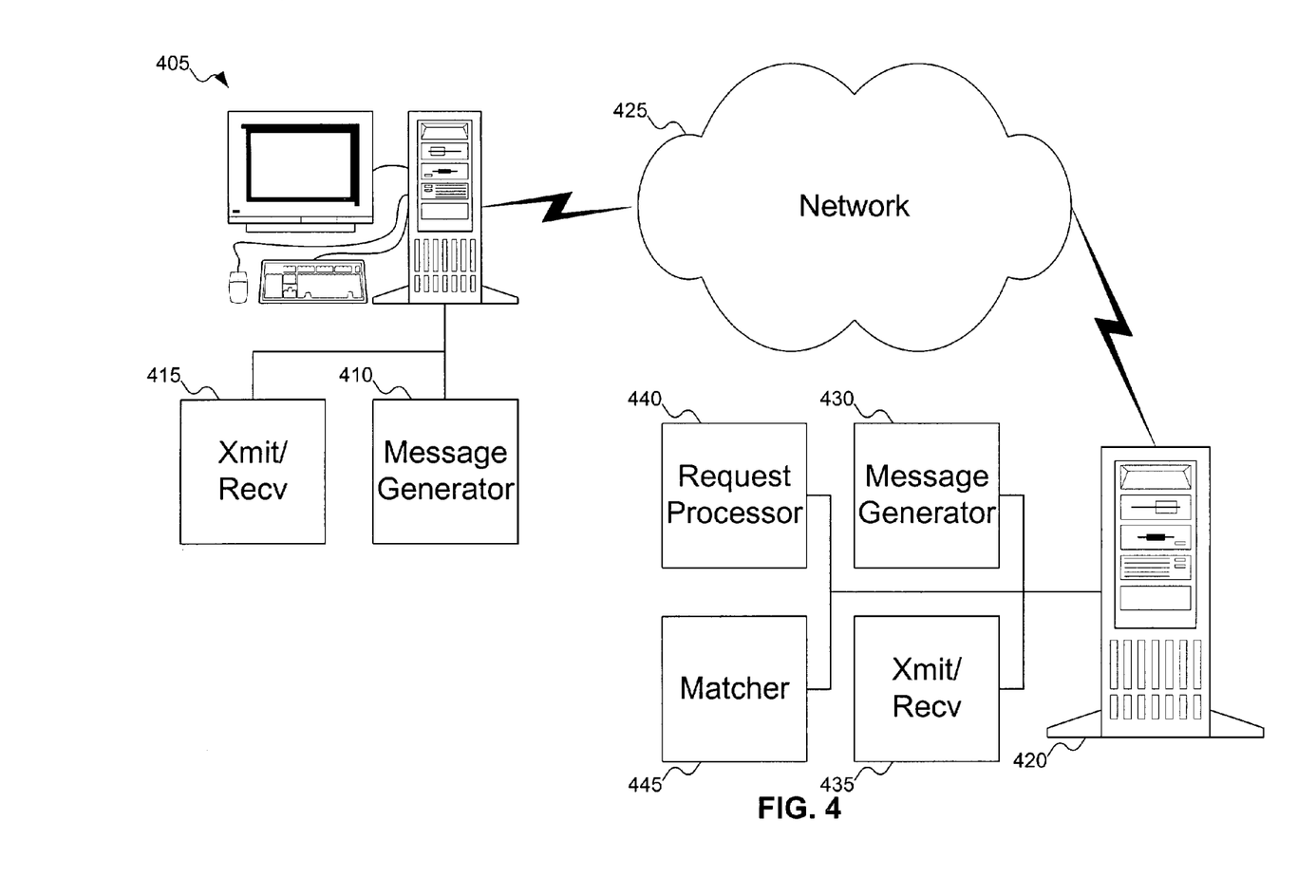
FIG. 4 shows the client and server of FIGS. 2 and 3 communicating across a network, according to an embodiment of the invention.

FIG. 4 shows the client and server of FIGS. 2 and 3 communicating across a network, according to an embodiment of the invention. In FIG. 4, client 405 is a desktop computer. Client 405 as shown includes the standard components of a computer, such as a computer, a monitor, a keyboard, and a mouse. But a person skilled in the art will recognize that client 405 may be any variety of computer or computing device capable of interacting with a network. For example, client 405 might be a notebook computer, an internet appliance, a personal digital assistant (PDA), or any other device capable of interacting with a server across a network.

Client 405 includes message generator 410 and transmitter/receiver 415. Message generator 410 is operable to generate message traffic from client 405 to a server, such as server 420, across a network, such as network 425. Message generator 410 is specifically operable to generate at the same time both the synchronization packet to start a TCP/IP handshake and the first data request. As discussed above, the first data request may be a parallel request using an unreliable protocol (as shown in FIG. 2) or may be data within the synchronization packet (as shown in FIG. 3). Transmitter/receiver 415 is responsible for transmitting and receiving traffic across network 425.

As with client 405, network 425 may take many different forms. Thus, network 425 may be a local area network (LAN), a wide area network (WAN), a wireless network wherein the client and server communicate using standards such as Bluetooth (Specification of the Bluetooth System, Version 1.1, Feb. 22, 2001) or any of the Institute for Electrical and Electronics Engineers (IEEE) 802.11 standards, or a global network. A person skilled in the art will recognize other forms network 425 may take.

Server 420 includes message generator 430, transmitter/receiver 435, request processor 440, and matcher 445. Message generator 430 generates message traffic to client 405 (for example, the synch/acknowledgment packet responsive to the synchronization packet). Transmitter/receiver 435 is the server equivalent to transmitter/receiver 415 of client 405, and transmits and receives messages from client 405. Request processor 440 is responsible to processing data requests from client 405, such as the first data request received from client 405. Finally, matcher 445 is responsible for matching the second data request, included in the acknowledgment packet, with the first data request (either as part of or in parallel with the synchronization packet), so that the response may be sent using the reliable protocol.

One potential drawback of an embodiment of the invention is that the server's vulnerability to denial of service attacks (such as synchronization floods) are increased. Because server 420 begins processing the data request even before the handshake is complete, the server may be spending time processing a request for data that came as part of a denial of service attack. There are several ways to address this problem. One solution is to implement an embodiment of the invention only in environments where the risk of a denial of service attack is low. Another solution is to give server 420 an awareness of the possibility of denial of service attacks, and to configure server 420 to ignore first data requests for a period of time when it looks like a denial of service attack is underway.

Figure 5:
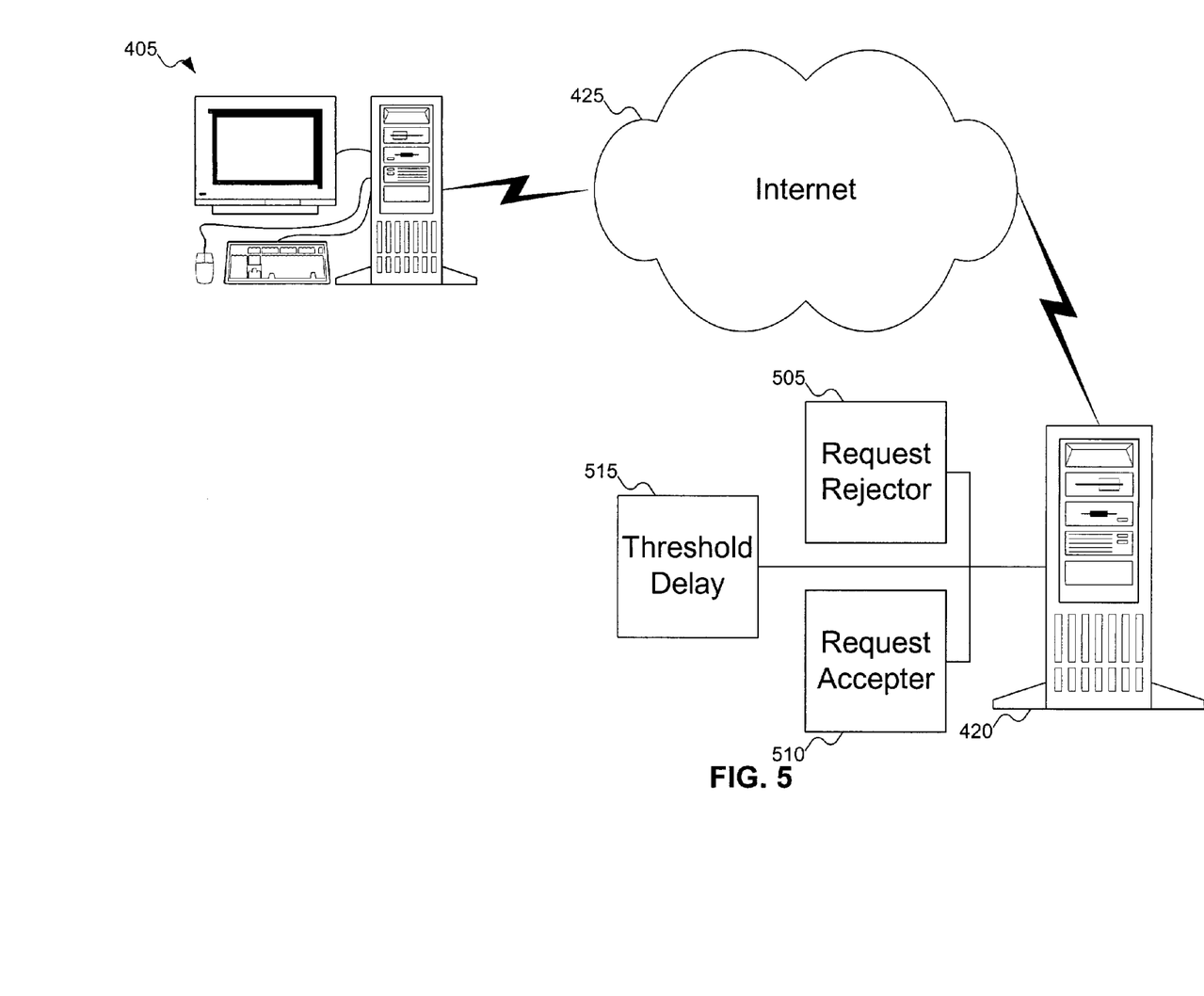
FIG. 5 shows the server of FIG. 4 equipped to reject requests, according to an embodiment of the invention.

FIG. 5 shows the server of FIG. 4 equipped to reject requests, according to an embodiment of the invention. In FIG. 5, server 420 includes modules request rejector 505 and request acceptor 510, along with threshold delay 515. When a parallel request comes in, server 420 may choose to accept or reject the parallel request. That is, server 420 may choose not to process the parallel request, and to wait for the second data request to arrive before beginning to process the data request. Modules request rejector 505 and request acceptor 510 use the threshold delay 515 to compare the amount of time between the last invalid first data request (as would happen in a denial of service attack) and the next first data request to determine whether or not to accept the next first data request.

Figure 6:
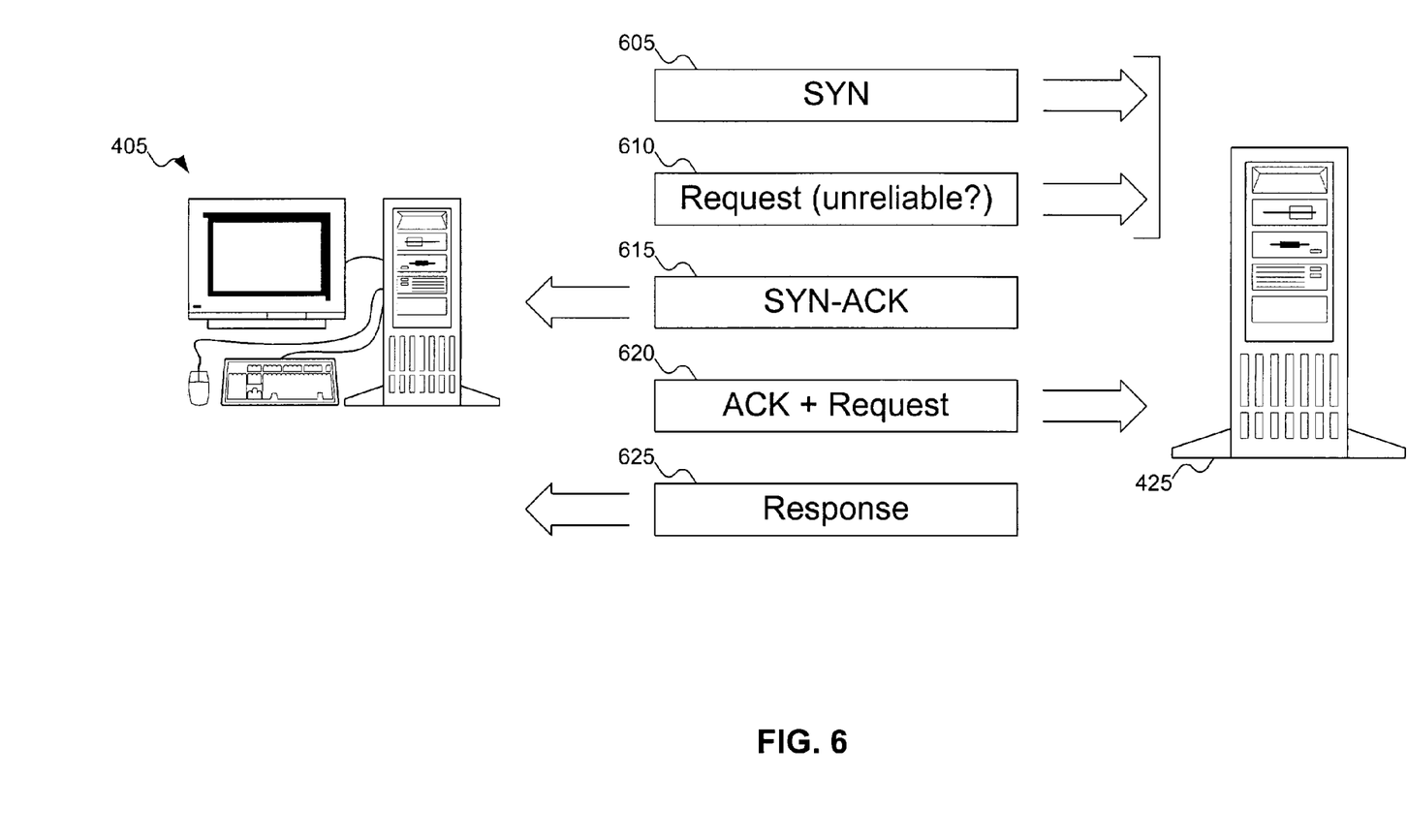
FIG. 6 shows the sequence of communications between the client and server of FIGS. 2 and 3, according to embodiments of the invention.

FIG. 6 shows the sequence of communications between the client and server of FIGS. 2 and 3, according to embodiments of the invention. Messages 605 and 610 are the synchronization packet and the first data request, respectively. As discussed above with reference to FIGS. 2 and 3, the first data request may be parallel to the synchronization packet using an unreliable protocol, or may be part of the synchronization packet. Message 615 is the synch/acknowledgment packet from the server to the client, responsive to synchronization message 605. Message 620 is the acknowledgment by the client, and includes the second data request. Finally, message 625 is the response by the server to the data request.

Figure 7A:
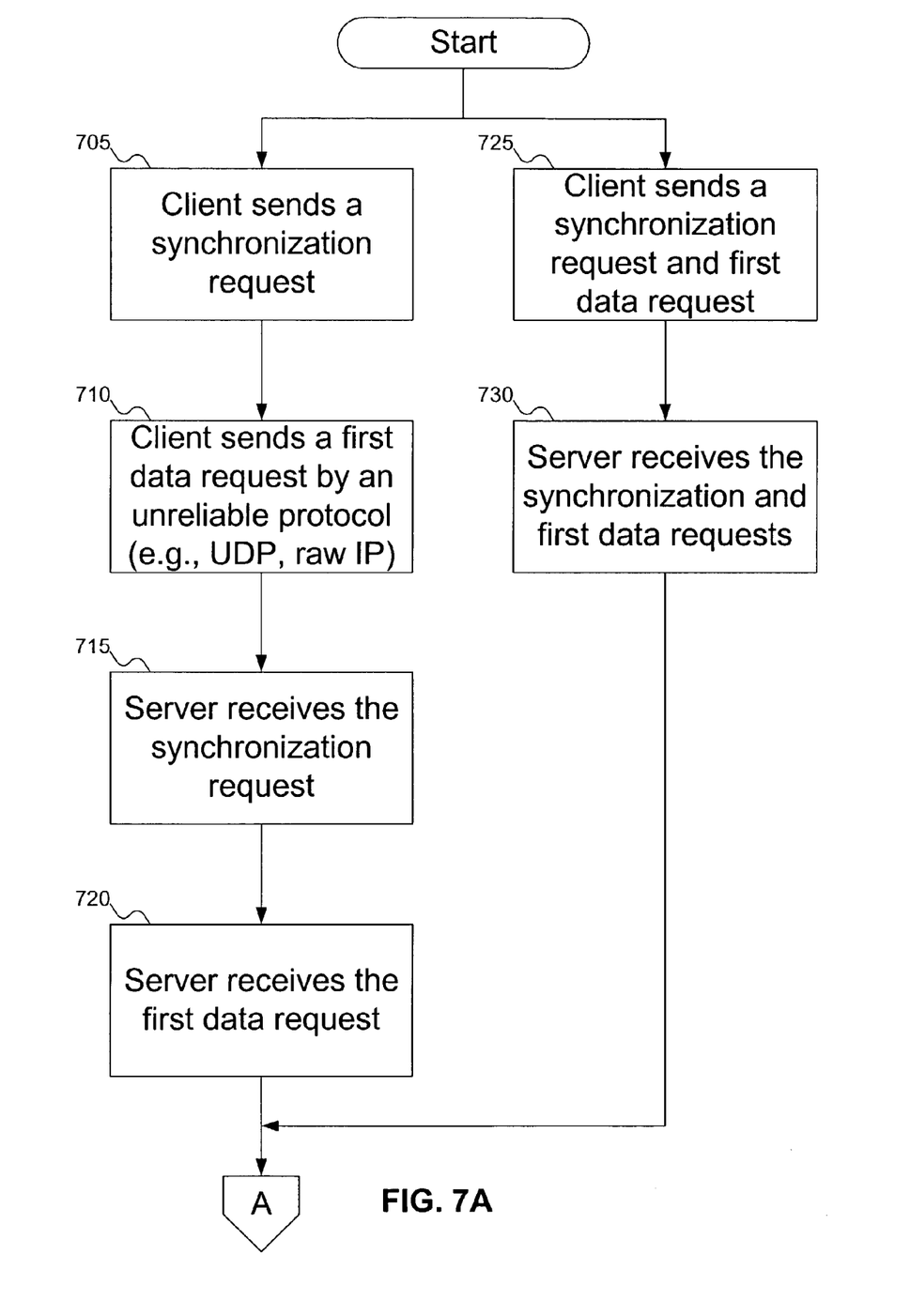
FIGS. 7A-7C show a flowchart of the procedure used by the client and server in FIGS. 2 and 3 to communicate, according to an embodiment of the invention.
Figure 7B:
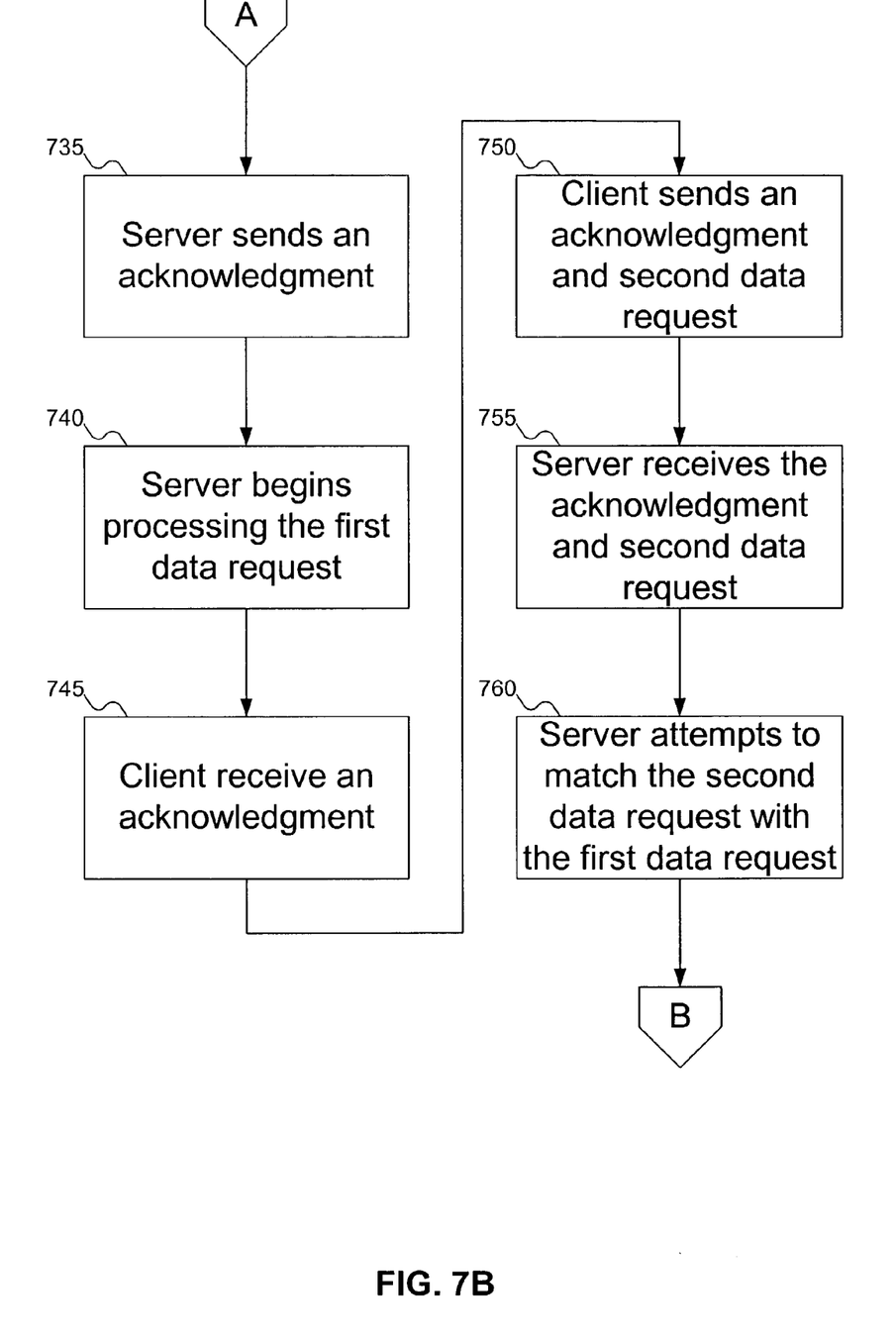
Figure 7C:
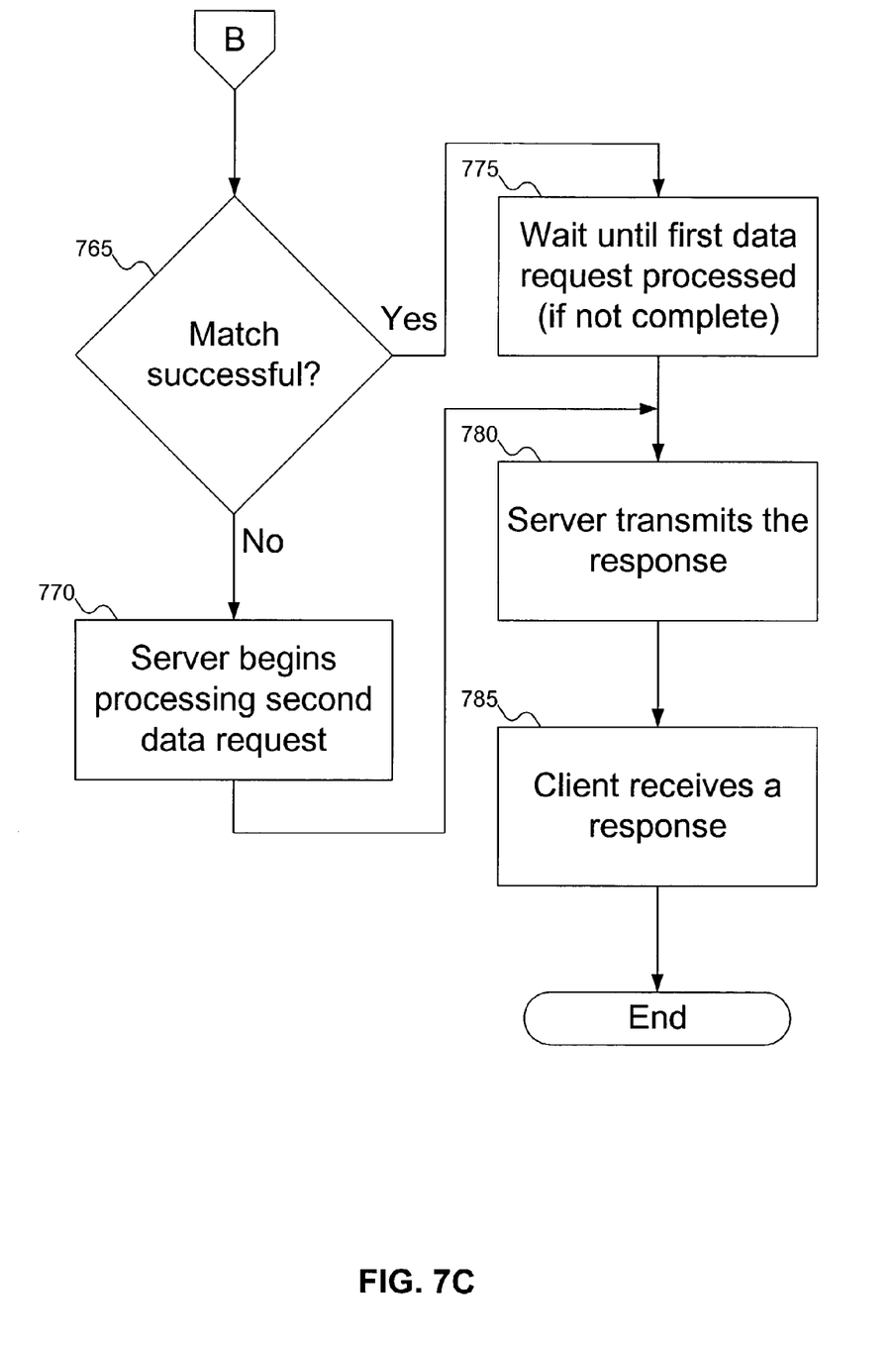

FIGS. 7A-7C show a flowchart of the procedure used by the client and server in FIGS. 2 and 3 to communicate, according to an embodiment of the invention. At block 705 (FIG. 7A), the client sends a synchronization request. At block 710, the client sends a first data request in parallel to the synchronization request, using an unreliable protocol (for example, UDP or a raw IP packet). At block 715, the server receives the synchronization packet, and at block 720 the server receives the parallel request.

Blocks 705-720 describe the procedure by which a client may use a parallel request to transmit the first data request. As discussed above with reference to FIG. 3, in a second embodiment the first data request is part of the synchronization packet. Blocks 725 and 730 describe this procedure. At block 725, the client sends the synchronization packet, with the first data request as part of the packet. At block 730, the server receives the synchronization packet with the first data request.

Regardless of whether the first data request is sent as a parallel request or in the synchronization packet, at block 735 (FIG. 7B), the server sends a synch/acknowledgment packet to the client. At block 740, the server begins to process the first data request. At block 745, the client receives the acknowledgment . At block 750, the client completes the handshake by sending an acknowledgment packet and the second data request: this second data request uses the reliable protocol. At block 755, the server receives the acknowledgment and second data request. At block 760, the server attempts to match the second data request with the first data request.

At decision point 765 (FIG. 7C), the server checks to see if it was able to match the second data request with the earlier first data request. If the server was unable to match the second data request, then at block 770 the server begins to process the second data request. Otherwise, at block 775 the server waits until the first data request is fully processed (if it was not already completely processed). At block 780, regardless of whether or not the match was successful, the server sends the response to the client, and at block 785, the client receives the response.

Figure 8A:
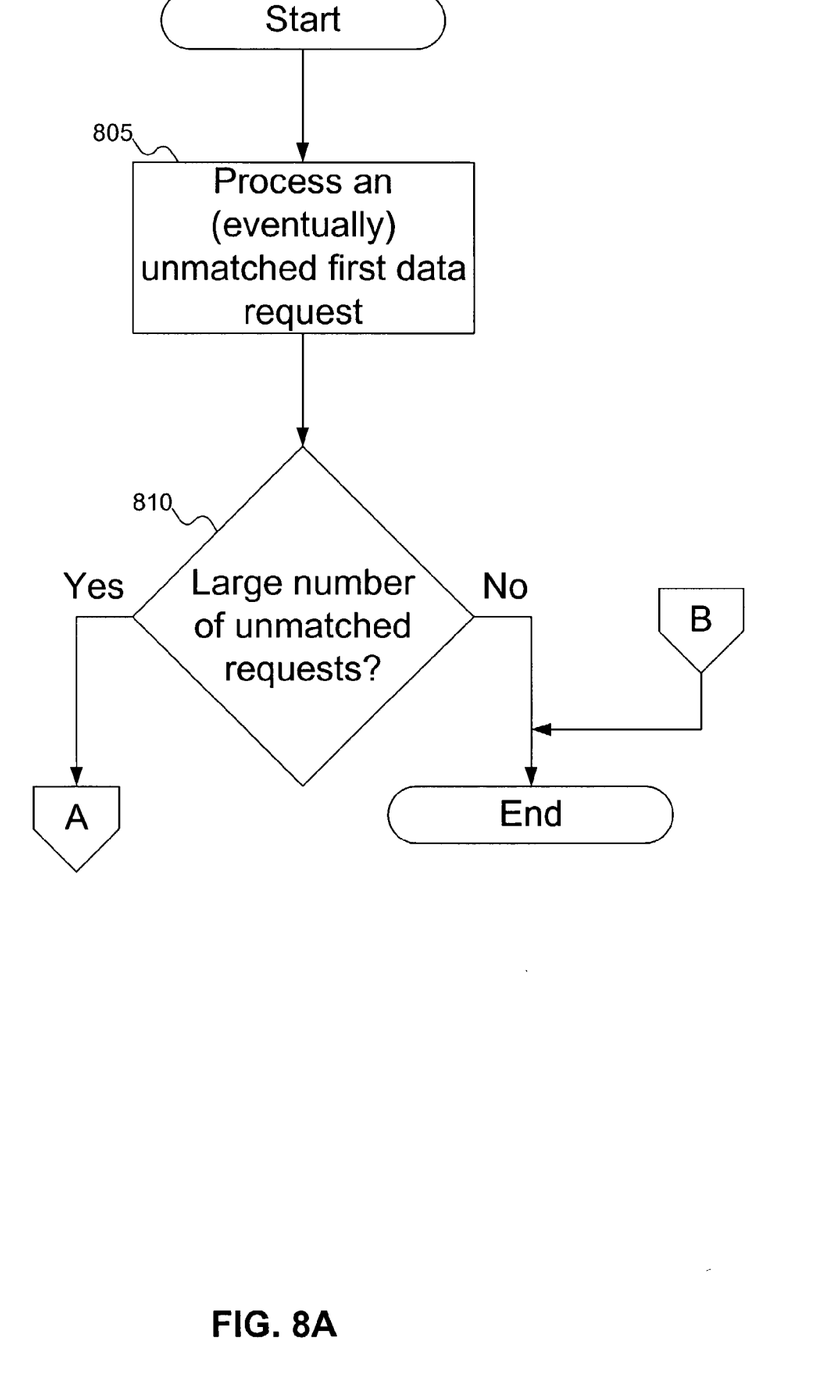
FIGS. 8A-8B show a flowchart of the procedure used by the server of FIG. 5 to reject requests, according to an embodiment of the invention.
Figure 8B:
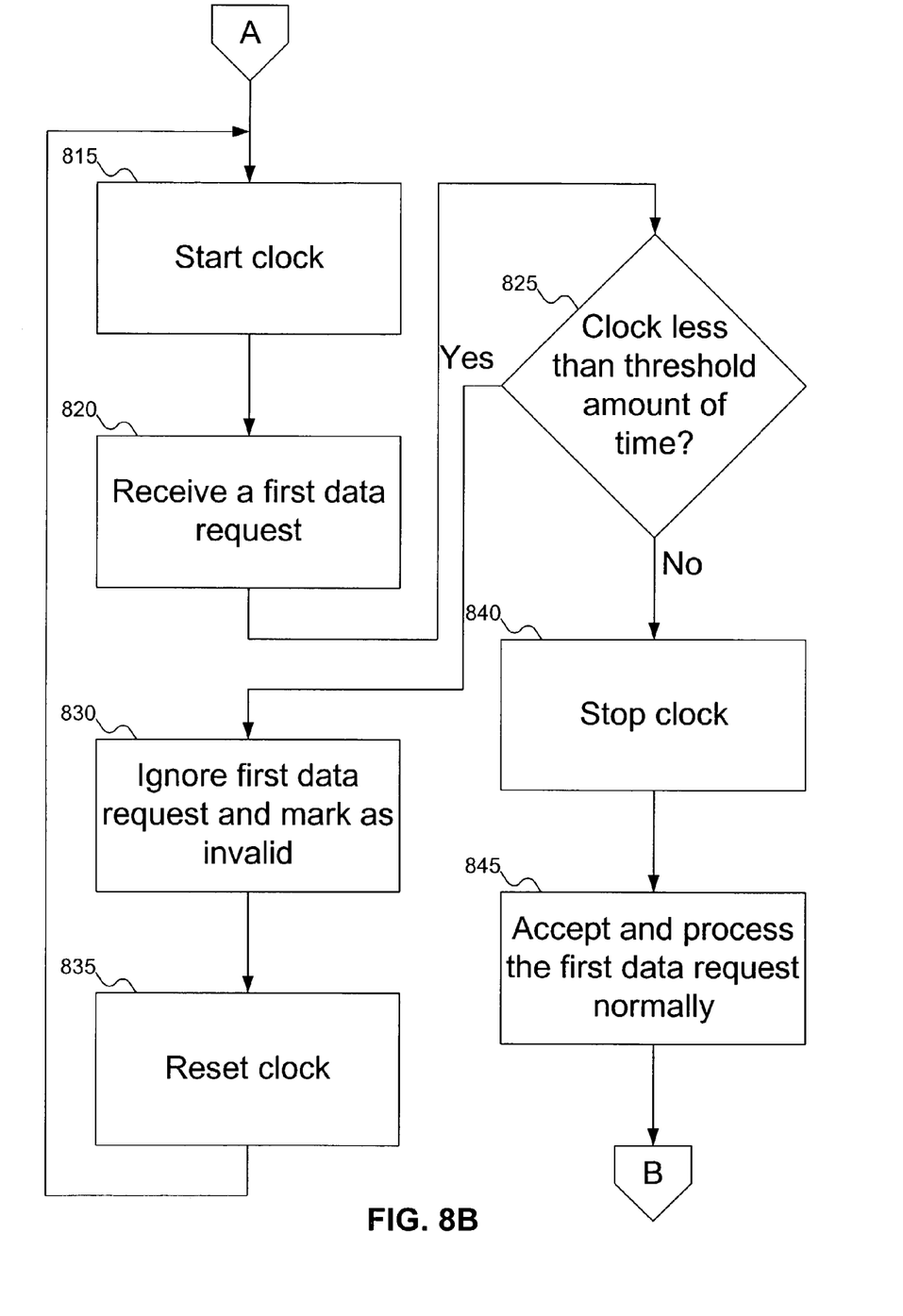

FIGS. 8A-8B show a flowchart of the procedure used by the server of FIG. 5 to reject requests, according to an embodiment of the invention. At block 805, the server has processed an unmatched (and therefore invalid) first data request. At decision point 810, the server checks to see how many invalid first data requests it has received in a given amount of time. If the server has not received enough invalid first data requests to justify ignoring future first data requests, then processing is complete. Otherwise, at block 815 (FIG. 8B), the server starts a clock. At block 820, the server receives another first data request. At decision point 825, the server checks the clock to see how much time elapsed between the last invalid first data request and the most recent first data request. If an insufficient amount of time has passed (i.e., less than the threshold delay), then at step 830 the server ignores the new first data request and marks it as invalid. At block 835, the server resets the clock, and processing returns to block 815.

On the other hand, if a sufficient amount of time has passed since the last invalid first data request, the server can start accepting first data requests again. At block 840, the server stops the clock, and at block 845 the server accepts the first data request and processes it.

A person skilled in the art will recognize that an embodiment of the invention described above may be implemented using a computer. In that case, the method is embodied as instructions that comprise a program. The program may be stored on computer-readable media, such as floppy disks, optical disks (such as compact discs), or fixed disks (such as hard drives). The program may then be executed on a computer to implement the method. A person skilled in the art will also recognize that an embodiment of the invention described above may include a computer-readable modulated carrier signal.

Having illustrated and described the principles of the invention in an embodiment thereof, it should be readily apparent to those skilled in the art that an embodiment of the invention may be modified in arrangement and detail without departing from such principles. All modifications coming within the spirit and scope of the accompanying claims are claimed.

The invention claimed is:

1. A system for a client to perform a handshake to communicate over a network, comprising:
   a message generator, the message generator operative to generate in parallel a synchronization request and a first data request, and to generate a second data request responsive to an acknowledgment from a server;
   a transmitter operative to transmit the synchronization request, the first data request, and the second data request to the server; and
   a receiver operative to receive the acknowledgment and a response from the server.

2. A system according to claim 1, wherein the message generator is operative to generate the first data request using an unreliable protocol.

3. A system according to claim 2, wherein the unreliable protocol is a user datagram protocol (UDP).

4. A system according to claim 2, wherein the unreliable protocol is an Internet Protocol (IP).

5. A system for a server to perform a handshake to communicate over a network, comprising:
   a receiver operative to receive a synchronization request, a first data request, and a second data request from a client, the synchronization request and the first data request received in paralell;
   a message generator operative to generate an acknowledgment responsive to the synchronization request, the acknowledgment generated after the first data request is received and before the second data request is received;
   a request processor operative to process the first data request and generate a response;
   a matcher operative to match the first and second data requests; and
   a transmitter to transmit the acknowledgment and response to the client.

6. A system according to claim 5, further comprising a first data request rejecter operative to reject the first data request if the server has received an earlier invalid first data request.

7. A system according to claim 6, further comprising a first data request accepter operative to accept the first data request if a threshold amount of time has passed without a second invalid first data request.

8. A system for a client and server to perform a handshake to communicate over a network, comprising:

a client, including a message generator, the message generator operative to generate in parallel a synchronization request and a first data request, and to generate a second data request responsive to an acknowledgment from a server;

the server, including a matcher operative to match the first and second data requests; and a network connecting the client and server.

9. A system according to claim 8, wherein the message generator is operative to generate the first data request using an unreliable protocol.

10. A method for a client to perform a handshake to communicate over a network, comprising:
   sending a synchronization request;
   sending a first data request in parallel to the synchronization request and before receiving an acknowledgment;
   receiving the acknowledgment;
   sending a second data request; and
   receiving a response.

11. A method according to claim 10, wherein receiving a response includes receiving the response responsive to both the first and second data requests.

12. A method according to claim 10, wherein sending a first data request includes sending the first data request via an unreliable protocol.

13. A method according to claim 12, wherein sending a first data request includes sending the first data request in a user datagram protocol (UDP) packet.

14. A method according to claim 10, wherein sending a first data request includes sending the first data request in a raw Internet Protocol (IP) packet.

15. A method according to claim 10, wherein sending a first data request includes sending the first data request as part of the synchronization request.

16. A method according to claim 10, wherein sending a second data request includes resending the first data request in combination with a response to the acknowledgment.

17. A method according to claim 10, further comprising processing the response.

18. A method for a server to perform a handshake to communicate over a network, comprising:
   receiving a synchronization request;
   receiving a first data request in parallel to the synchronization request and before sending an acknowledgment in response to the synchronization request;
   sending the acknowledgment in response to the synchronization request;
   receiving a second data request; and
   sending a response.

19. A method according to claim 18, wherein receiving a first data request includes receiving the first data request via an unreliable protocol.

20. A method according to claim 19, wherein receiving a first data request includes receiving the first data request in a user datagram protocol (UDP) packet.

21. A method according to claim 18, wherein receiving a first data request includes receiving the first data request in a raw Internet Protocol (IP) packet.

22. A method according to claim 18, wherein receiving a first data request includes receiving the first data request as part of the synchronization request.

23. A method according to claim 18, wherein receiving a second data request includes receiving a second transmission of the first data request in combination with a response to the acknowledgment.

24. A method according to claim 18, wherein:
   the method further comprises processing the first data request before receiving the second data request to generate the response; and sending the response include sending the response after receiving the second data request.

25. A method according to claim 24, wherein sending the response further includes matching the second data request with the first data request.

26. A method according to claim 18, further comprising ignoring the first data request.

27. A method according to claim 26, wherein ignoring the first data request includes receiving at least one earlier invalid first data request.

28. A method according to claim 27, further comprising processing the first data request after a threshold amount of time has passed without a second invalid first data request.

29. A method according to claim 26, wherein ignoring the first data request includes analyzing the load on the server.

30. A method for a client and a server to perform a handshake to communicate over a network, comprising:
   the client sending in parallel a synchronization request and a first data request;
   the server receiving the synchronization request and the first data request, the server receiving the first data request before sending an acknowledgment in response to the synchronization request;
   the server sending the acknowledgment in response to the synchronization request;
   the server processing the first data request;
   the client receiving the acknowledgment;
   the client sending a second data request;
   the server receiving the second data request;
   the server sending a response; and
   the client receiving the response.

31. A method according to claim 30, wherein the client sends and the server receives the first data request via an unreliable protocol.

32. A method according to claim 30, wherein sending the response further includes the server matching the second data request with the first data request.

33. An article comprising:
   a storage medium, said storage medium having stored thereon instructions, that, when executed by a computer, result in:
   sending a synchronization request;
   sending a first data request in parallel to the synchronization request and before receiving an acknowledgment;
   receiving the acknowledgment;
   sending a second data request; and
   receiving a response.

34. An article according to claim 33, wherein sending a first data request includes sending the first data request as part of the synchronization request.

35. An article comprising:
   a storage medium, said storage medium having stored thereon instructions, that, when executed by a computer, result in:
   receiving a synchronization request;
   receiving a first data request in parallel to the synchronization request and before sending an acknowledgment in response to the synchronization request;
   sending the acknowledgment in response to the synchronization request;
   receiving a second data request; and
   sending a response.

36. An article according to claim 35, wherein receiving a first data request includes receiving the first data request as part of the synchronization request.

* * * * *

UNITED STATES PATENT AND TRADEMARK OFFICE
CERTIFICATE OF CORRECTION

| | | |
|---|---|---|
| PATENT NO. | : 7,321,935 B2 | Page 1 of 1 |
| APPLICATION NO. | : 10/177024 | |
| DATED | : January 22, 2008 | |
| INVENTOR(S) | : Yevgeniy Epshteyn | |

It is certified that error appears in the above-identified patent and that said Letters Patent is hereby corrected as shown below:

Column 6, line 48, the word "paralell;" should read -- parallel; --.

Signed and Sealed this

Thirtieth Day of December, 2008

JON W. DUDAS
*Director of the United States Patent and Trademark Office*